(12) United States Patent
Takachi et al.

(10) Patent No.: US 9,561,835 B2
(45) Date of Patent: Feb. 7, 2017

(54) BICYCLE BRAKE ASSEMBLY

(75) Inventors: Takeshi Takachi, Osaka (JP); Tsutomu Muraoka, Osaka (JP)

(73) Assignee: Shimano Inc., Osaka (JP)

( * ) Notice: Subject to any disclaimer, the term of this patent is extended or adjusted under 35 U.S.C. 154(b) by 26 days.

(21) Appl. No.: 13/526,972

(22) Filed: Jun. 19, 2012

(65) Prior Publication Data

US 2013/0333985 A1    Dec. 19, 2013

(51) Int. Cl.
*B62L 1/14* (2006.01)
*B62L 1/06* (2006.01)

(52) U.S. Cl.
CPC ... *B62L 1/06* (2013.01); *B62L 1/14* (2013.01)

(58) Field of Classification Search
CPC ..................... B62L 1/06; B62L 1/14
See application file for complete search history.

(56) References Cited

U.S. PATENT DOCUMENTS

| | | | | |
|---|---|---|---|---|
| 4,051,924 A * | 10/1977 | Yoshigai | .................... | 188/24.12 |
| 5,195,710 A * | 3/1993 | Remblier | ............. | B23Q 1/5462 |
| | | | | 248/201 |
| 5,328,001 A * | 7/1994 | Yoshikawa | ................ | 188/24.22 |
| 5,501,301 A * | 3/1996 | Nishimura | ................ | 188/24.19 |
| 5,819,880 A | 10/1998 | Ota et al. | | |
| 6,230,849 B1 * | 5/2001 | Lumpkin | ................... | 188/24.12 |
| 6,412,605 B2 * | 7/2002 | Campagnolo | ............. | 188/24.11 |
| 6,431,327 B2 | 8/2002 | Lumpkin | | |
| 6,874,601 B2 * | 4/2005 | Kuo | .......................... | 188/24.22 |
| 6,945,369 B1 * | 9/2005 | Chen | ...................... | B62L 1/005 |
| | | | | 188/205 R |
| 7,007,776 B1 | 3/2006 | Lin | | |
| 8,096,392 B2 * | 1/2012 | Edwards et al. | ........... | 188/24.12 |
| 8,297,415 B2 * | 10/2012 | Edwards | .................... | 188/24.12 |
| 2005/0281611 A1 * | 12/2005 | Matczak | ....................... | 403/122 |
| 2006/0037819 A1 | 2/2006 | Takizawa | | |
| 2008/0000729 A1 | 1/2008 | Takizawa | | |
| 2009/0078512 A1 * | 3/2009 | Edwards et al. | ........... | 188/24.12 |
| 2011/0139552 A1 | 6/2011 | Nago | | |

FOREIGN PATENT DOCUMENTS

| | | |
|---|---|---|
| CN | 201264697 Y | 7/2009 |
| TW | 277484 U | 6/1996 |

OTHER PUBLICATIONS

U.S. Appl. No. 13/184,671, filed Jul. 18, 2011, Takeda et al.

* cited by examiner

*Primary Examiner* — Thomas Irvin
(74) *Attorney, Agent, or Firm* — Global IP Counselors (57) ABSTRACT

A bicycle brake assembly includes a brake unit, a fixing structure and an alignment structure. The brake unit includes first and second brake arms. The fixing structure is configured to operatively couple the brake unit to a brake supporting portion of a bicycle frame. The alignment structure is disposed in the vicinity of the fixing structure. The alignment structure is configured to align the brake unit to the brake supporting portion.

15 Claims, 8 Drawing Sheets

BICYCLE BRAKE ASSEMBLY

BACKGROUND

Field of the Invention

This invention generally relates to a bicycle brake assembly. More specifically, the present invention relates to a bicycle brake assembly with a pair of brake arms.

Background Information

Bicycles are typically provided with at least one brake device for stopping. Currently, a wide variety of bicycle brake devices are available. One of the most popular types of bicycle brake devices is a rim brake. Rim brakes are configured to apply a braking force to the wheel of a bicycle by pinching the rim of the wheel with a pair of brake shoes attached to a pair of brake arms. One well-known example of a rim brake is a caliper brake. Caliper brakes are also available in several configurations. For example, caliper brakes include a side pull type, a center pull type and a dual-pivot type. One example of a caliper brake is disclosed in U.S. Pat. No. 5,819,880.

Brake devices should be accurately aligned relative to the rim of the wheel for properly applying a braking force to the rim of the wheel.

SUMMARY

One object of the present disclosure is to provide a bicycle brake assembly with which a brake unit is accurately aligned with respect to a bicycle frame.

In accordance with one aspect of the present disclosure, a bicycle brake assembly includes a brake unit, a fixing structure and an alignment structure. The brake unit includes first and second brake arms. The fixing structure is configured to operatively couple the brake unit to a brake supporting portion of a bicycle frame. The alignment structure is disposed in the vicinity of the fixing structure. The alignment structure is configured to align the brake unit to the brake supporting portion.

These and other objects, features, aspects and advantages will become apparent to those skilled in the art from the following detailed description, which, taken in conjunction with the annexed drawings, discloses selected embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring to FIGS. 1 to 4, a front portion of a bicycle 10 is illustrated that is equipped with a bicycle brake device 12 (e.g., a brake unit) in accordance with a first embodiment. The bicycle brake device 12 is a side pull caliper rim brake, and more particularly, a dual-pivot, side pull caliper rim brake. In particular, the bicycle brake device 12 is pivotally coupled to a front fork 14 (e.g., a bicycle frame) of the bicycle 10. The bicycle brake device 12 is configured and arranged relative to the front fork 14 for selectively gripping a front wheel 16 at a bicycle rim 18 of the front wheel 16 to apply a braking force using friction. In particular, the rider will operate a brake operating device which in turn will pull a brake cable to cause the bicycle brake device 12 to engage the bicycle rim 18 of the front wheel 16 in a conventional manner. Of course, it will be apparent from this disclosure that the bicycle brake device 12 can be mounted a rearward portion of the bicycle 10 for selectively gripping a bicycle rim of a rear wheel (not shown). Furthermore, bicycles and their various components are well-known in the prior art, and thus, the bicycle 10 and its various components will not be discussed or illustrated in detail herein, except for the components of the bicycle 10 which relate to the bicycle brake device 12.

Figure 1:
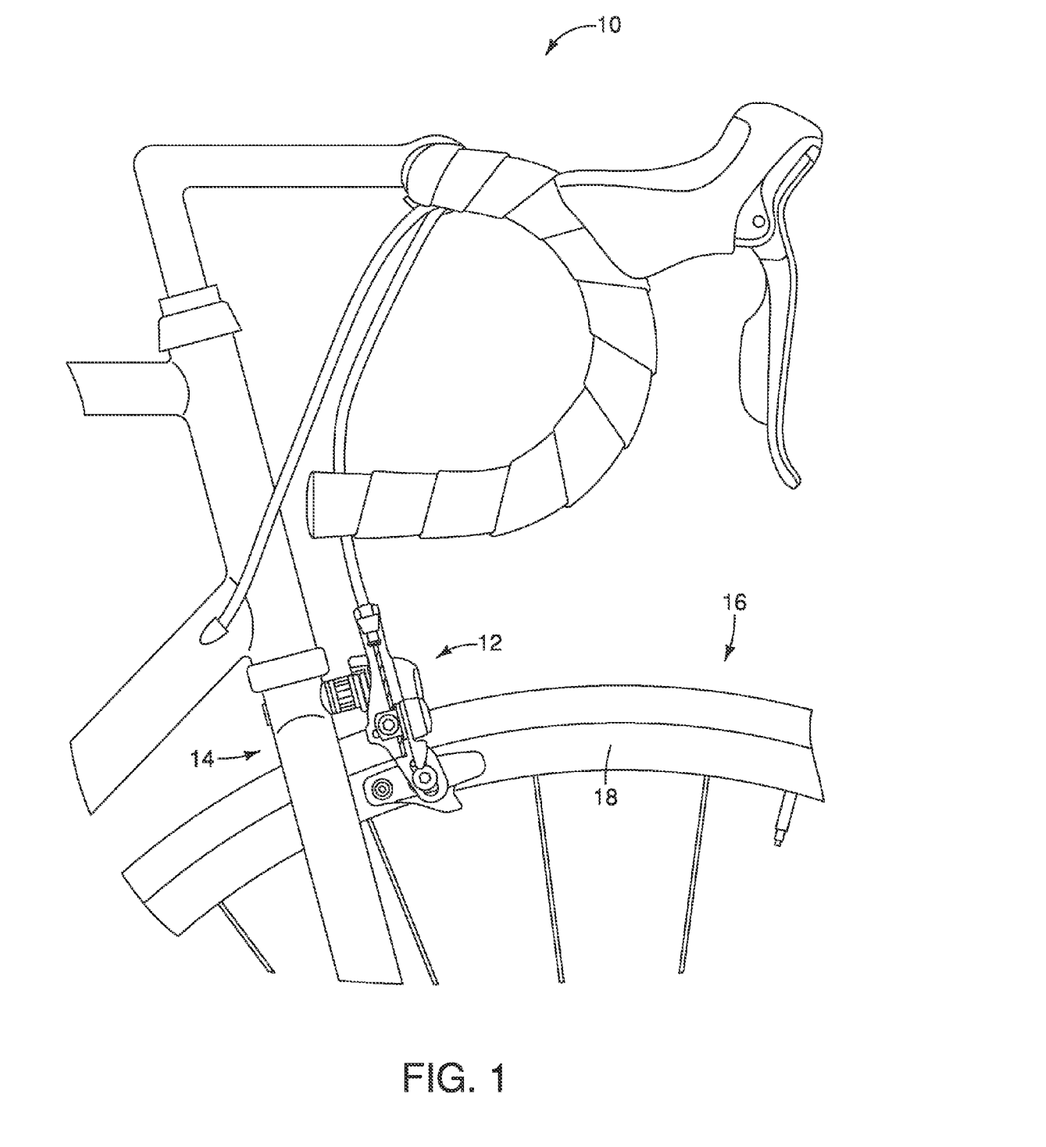
FIG. 1 is a partial side elevational view of a bicycle that is equipped with a bicycle brake assembly in accordance with a first embodiment.
Figure 2:
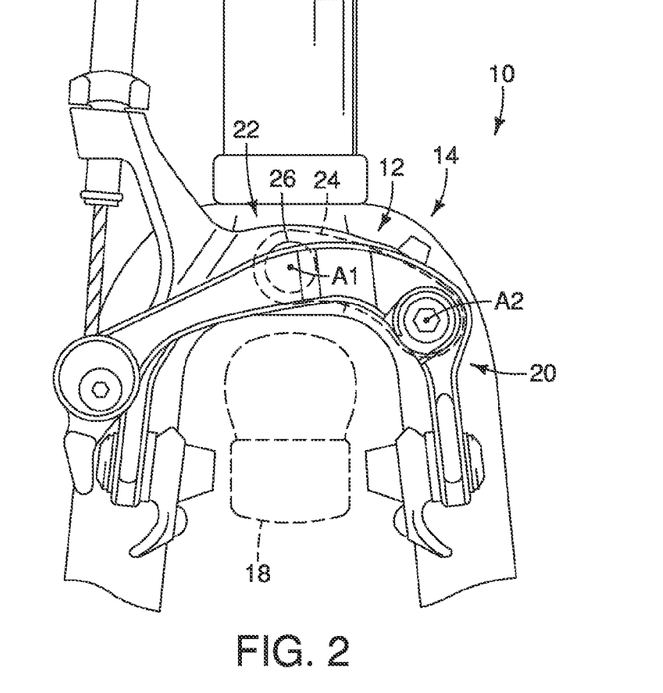
FIG. 2 is a partial front elevational view of the bicycle illustrated in FIG. 1, illustrating the bicycle brake assembly attached to a front fork of the bicycle.
Figure 3:
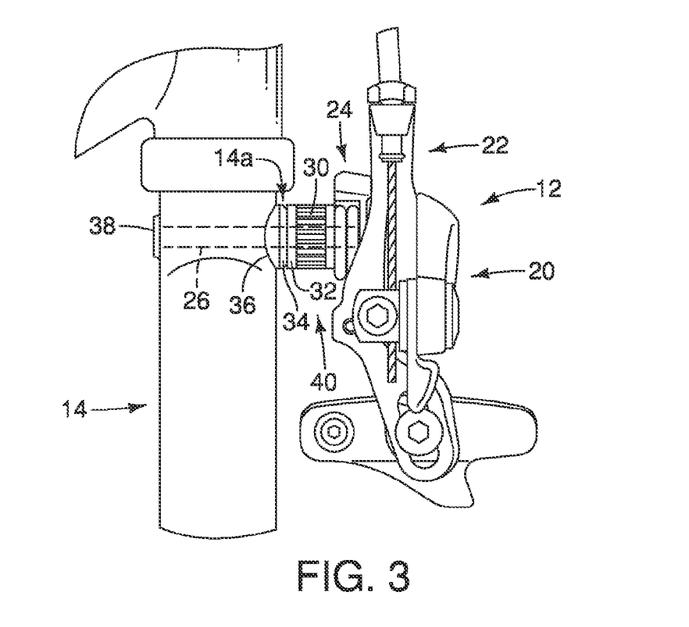
FIG. 3 is a enlarged side elevational view of the bicycle brake assembly illustrated in FIG. 1.

Basically, as seen in FIGS. 2 and 3, the bicycle brake device 12 includes a first brake arm 20, a second brake arm 22 and a mounting arm 24. The first brake arm 20 is a generally C-shaped member, while the second brake arm 22 is a Y-shaped member. The first brake arm 20, the second brake arm 22 and the mounting arm 24 are rigid members formed of a suitable material such as a metallic material or a fiber reinforced plastic material.

The first and second brake arms 20 and 22 are pivotally supported relative to each other by the mounting arm 24. In particular, the second brake arm 22 is pivotally attached to the mounting arm 24 by a mounting bolt 26 (e.g., a fixing structure) that is also used to mount the entire bicycle brake device 12 to the bicycle 10. The center axis of the mounting bolt 26 defines a first pivot axis A1 of the bicycle brake device 12. The first brake arm 20 is pivotally attached to the mounting arm 24 by a support bolt (not shown). The center axis of the support bolt defines a second pivot axis A2 of the bicycle brake device 12. Thus, a dual-pivot arrangement is provided in the bicycle brake device 12 of the illustrated embodiment. As seen in FIG. 3, a spring is provided between the first and second brake arms 20 and 22 in a conventional manner for biasing the first and second brake arms 20 and 22 to their non-braking positions.

As shown in FIGS. 2 and 3, the bicycle brake device 12 is installed on the front fork 14 such that the bicycle brake device 12 straddles the bicycle rim 18 of the front wheel 16. More specifically, the bicycle brake device 12 is positioned such that brake shoes of the first and second brake arms 20 and 22 are located proximate opposing sides of the bicycle rim 18 of the front wheel 16. With the bicycle brake device 12, when an inner wire cable of the brake cable is pulled by a brake lever provided to a handlebar of the bicycle 10, the first and second brake arms 20 and 22 swing toward the bicycle rim 18, the brake shoes are pressed against the bicycle rim 18, and a braking force is thereby applied. When the brake lever is returned to its original position, the first and second brake arms 20 and 22 are swung to the other side (i.e., the brake release side) by the spring, and the braking force is released from the bicycle rim 18. With this bicycle brake device 12, the first brake arm 20 pivots around the second pivot axis A2 and the second brake arm 22 pivots around the first pivot axis A1 such that a uniform and powerful braking force is obtained at the brake shoes.

Such caliper rim brakes are described, for example, in U.S. patent application Ser. No. 13/184,671, which is hereby incorporated herein by reference. Thus, for the sake of brevity, the details of the construction of the bicycle brake device 12 will be omitted.

Figure 4:
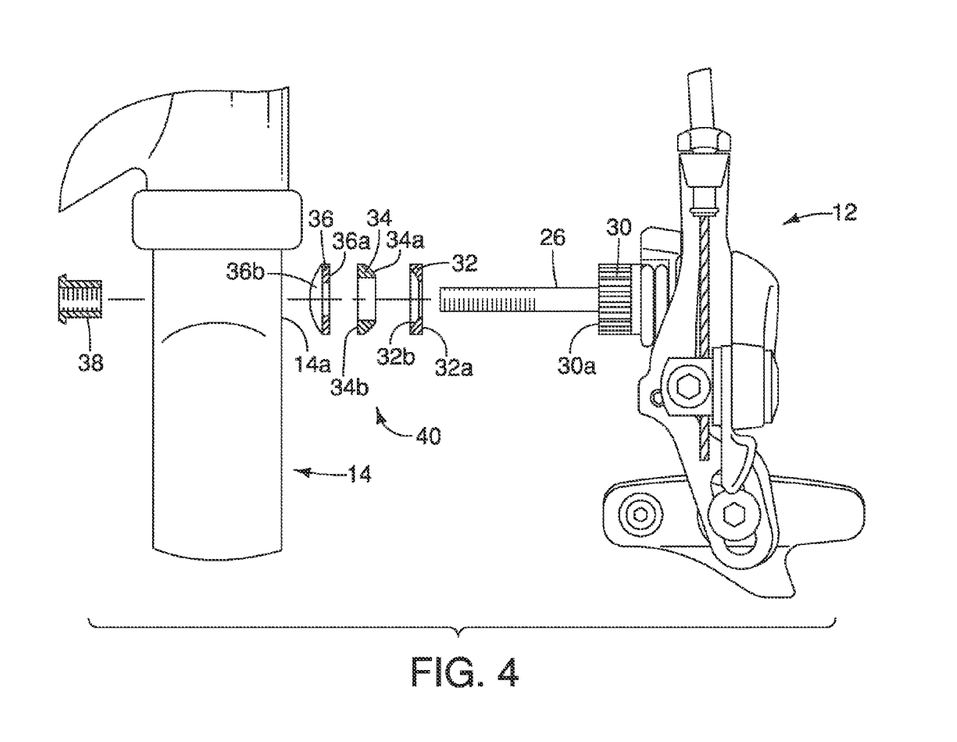
FIG. 4 is an exploded side elevational view of the bicycle brake assembly illustrated in FIG. 3.

As described above, the bicycle brake device 12 is mounted to the front fork 14 of the bicycle 10 by the single mounting bolt 26. Specifically, as seen in FIGS. 3 and 4, the bicycle brake device 12 is mounted to the front fork 14 by the single mounting bolt 26 via an attachment spacer 30 (e.g., an attachment portion), a first washer 32, a second washer 34, and a third washer 36. The attachment spacer 30 is a cylindrical member with a bolt through hole. The attachment spacer 30 is disposed on the mounting bolt 26 axially between the bicycle brake device 12 and the front fork 14. The first, second and third washers 32, 34 and 36 are generally annular members with bolt through holes, respectively. The first, second and third washers 32, 34 and 36 are disposed on the mounting bolt 26 axially between the attachment spacer 30 and the front fork 14. The mounting bolt 26 extends through mounting holes of the second brake arm 22 and the mounting arm 24 such that the second brake arm 22 and the mounting arm 24 are pivotally supported on the mounting bolt 26. The mounting bolt 26 also extends through the bolt through holes of the attachment spacer 30, and the first, second and third washers 32, 34 and 36 in this order. Moreover, the mounting bolt 26 extends through a mounting hole formed on a brake supporting portion 14a of the front fork 14, and then is screwed to a fixing nut 38 disposed on a portion opposite the brake supporting portion 14a of the front fork 14. The attachment spacer 30 is a rigid member formed of a suitable material such as a metallic material or a fiber reinforced plastic material. Furthermore, the first, second and third washers 32, 34 and 36 are formed of a suitable material conventionally used for washers, such as a metal material or a plastic material. The mounting bolt 26 and the fixing nut 38 form a fixing structure that operatively couples the bicycle brake device 12 to the brake supporting portion 14a of the front fork 14.

As seen in FIG. 4, the attachment spacer 30 is an annular member with a flat end face 30a (e.g., an abutment face). The flat end face 30a of the attachment spacer 30 has a flat annular surface. As further seen in FIG. 7, the first washer 32 is an annular member with a flat end face 32a (e.g., a flat contact face) and a first alignment face 32b (e.g., a first contact face) that is opposite the flat end face 32a. The flat end face 32a of the first washer 32 has a flat annular surface. The first alignment face 32b of the first washer 32 has a concave surface. In particular, the first alignment face 32b of the first washer 32 has a partial spherical concave surface. The second washer 34 is an annular member with a second alignment face 34a (e.g., a second contact face) and a flat end face 34b (e.g., a flat contact face) that is opposite the second alignment face 34a. The second alignment face 34a of the second washer 34 has a convex surface. In particular, the second alignment face 34a of the second washer 34 has a partial spherical convex surface. The flat end face 34b of the second washer 34 has a flat annular surface. The third washer 36 is an annular member with a flat end face 36a (e.g., a flat contact face) and a curved end face 36b that is opposite the flat end face 36a. As further seen in FIGS. 5 to 7, the flat end face 30a of the attachment spacer 30 contacts with the flat end face 32a of the first washer 32. The first alignment face 32b of the first washer 32 contacts with the second alignment face 34a of the second washer 34. The flat end face 34b of the second washer 34 contacts with the flat end face 36a of the third washer 36. The curved end face 36b of the third washer 36 contacts with an end face of the brake supporting portion 14a of the front fork 14.

Figure 5:
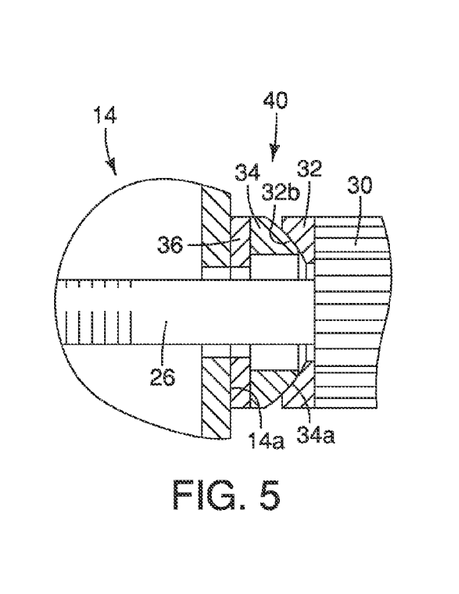
FIG. 5 is a partial cross sectional view of the bicycle brake assembly illustrated in FIG. 1, illustrating an alignment structure of the bicycle brake assembly.
Figure 6:
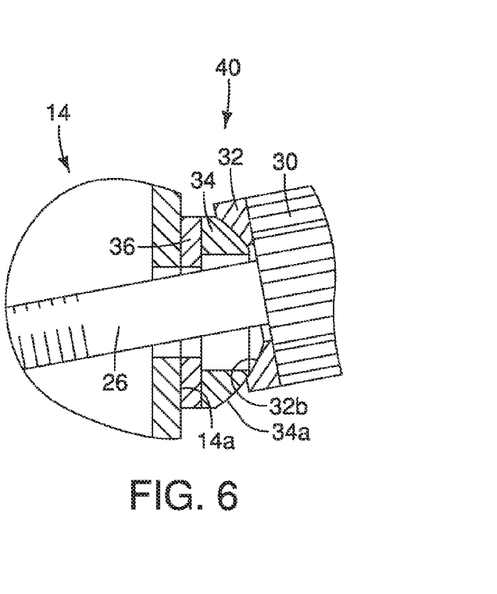
FIG. 6 is a partial cross sectional view of the bicycle brake assembly illustrated in FIG. 1, illustrating the alignment structure of the bicycle brake assembly.
Figure 7:
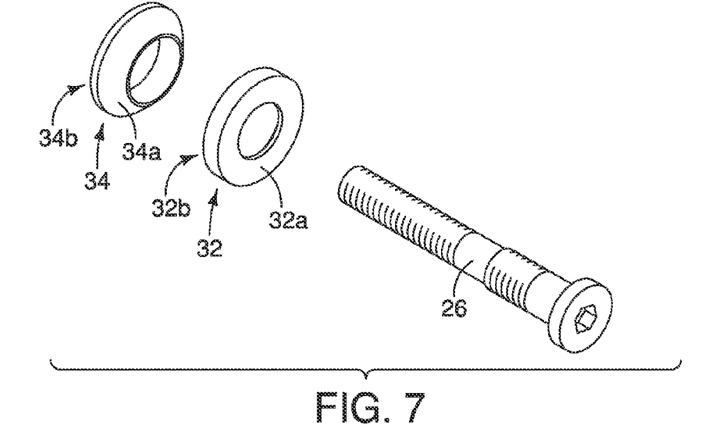
FIG. 7 is an exploded perspective view of the alignment structure of the bicycle brake assembly illustrated in FIG. 5, illustrating a partial spherical convex surface of a washer of the alignment structure.

As seen in FIGS. 5 and 6, the first alignment face 32b of the first washer 32 has a partial spherical concave surface. On the other hand, the second alignment face 34a of the second washer 34 has a partial spherical convex surface. The first alignment face 32b of the first washer 32 has the curvature that corresponds to the curvature of the second alignment face 34a of the second washer 34. In particular, the first alignment face 32b of the first washer 32 has the curvature that is equal to the curvature of the second alignment face 34a of the second washer 34 such that the first alignment face 32b and the second alignment face 34a can fit together. Therefore, as seen in FIGS. 5 and 6, the first washer 32 and the second washer 34 rock or slide relative to each other with respect to the mounting bolt 26 while maintaining the surface-to-surface contact between the first and second alignment faces 32b and 34a. The first alignment face 32b of the first washer 32 and the second alignment face 34a of the second washer 34 form an alignment structure 40 that aligns the bicycle brake device 12 to the brake supporting portion 14a of the front fork 14. The alignment structure 40 is disposed on vicinity of the mounting bolt 26. The alignment structure 40 is disposed between the brake supporting portion 14a and the attachment spacer 30 of the bicycle brake device 12. The curved end face 36b of the third washer 36 also has a shape that corresponds to the end face of the brake supporting portion 14a of the front fork 14 such that the curved end face 36b of the third washer 36 and the end face of the brake supporting portion 14a of the front fork 14 ensure surface-to-surface contact therebetween.

With this alignment structure 40, misalignment between the attachment spacer 30 and the brake supporting portion 14a of the front fork 14 can be eliminated, which also ensures that the bicycle brake device 12 is accurately aligned relative to the front fork 14. Furthermore, the bicycle brake device 12 can be securely coupled to the front fork 14.

Figure 8:
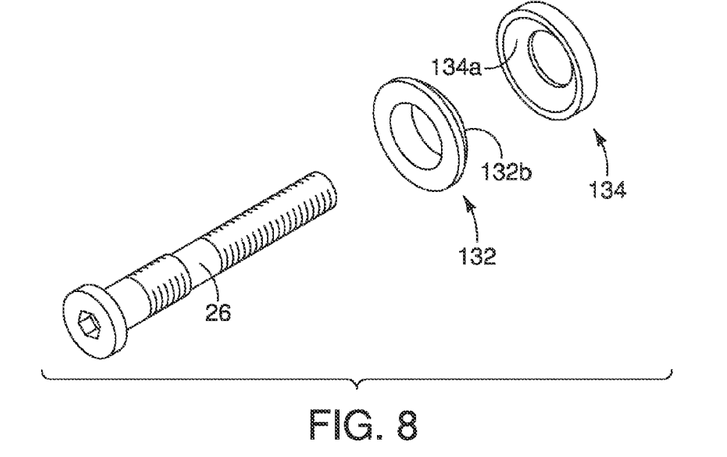
FIG. 8 is an exploded perspective view of a modified alignment structure of a bicycle brake assembly, illustrating a partial spherical concave surface of a washer of the alignment structure.

With the arrangement illustrated above, the first alignment face 32b of the first washer 32 has a concave surface, and the second alignment face 34a of the second washer 34 has a convex surface. However, axial locations of the concave surface and the convex surface of the alignment structure 40 along the mounting bolt 26 are interchangeable. For example, as seen in FIG. 8, a modified first washer 132 can include a partial spherical convex surface 132b as a first alignment face, and a modified second washer 134 can include a partial spherical concave surface 134a as a second alignment face that mates with the partial spherical convex surface 132b of the first washer 132.

With the arrangement illustrated above, the attachment spacer 30, and first, second and third washers 32, 34 and 36 are separately formed as independent members, respectively. However, the attachment spacer 30, and the first, second and third washers 32, 34 and 36 can be integrally formed with other bicycle components, respectively.

Figure 9:
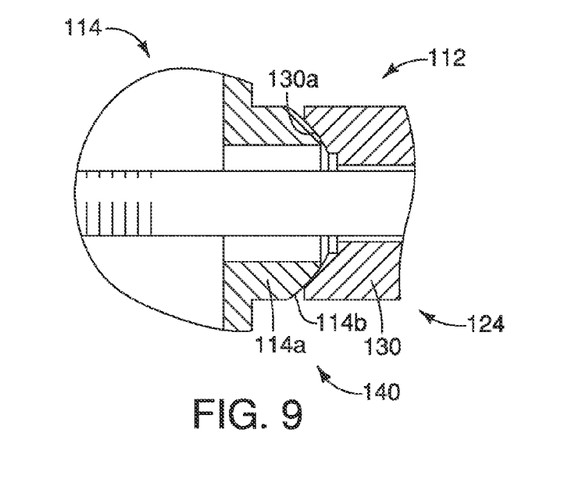
FIG. 9 is a partial cross sectional view of a modified example of an alignment structure of a bicycle brake assembly.

For example, as seen in FIG. 9, the attachment spacer 30 and the first washer 32 can be integrally formed with the mounting arm 24 as a one-piece, unitary member. Furthermore, the second and third washers 34 and 36 can be integrally formed with the brake the front fork 14 as a one-piece, unitary member. In this case, as illustrated in FIG. 9, a modified mounting arm 124 of a bicycle brake device 112 (e.g., a brake unit) has a first alignment face 130a, and a modified brake supporting portion 114a has a second alignment face 114b. In other words, the bicycle brake device 112 (e.g., a brake unit) is directly mounted on a front fork 114 (e.g., a brake supporting portion of a bicycle frame). The first alignment face 130a can be formed on a part 130 of the mounting arm 124 of the bicycle brake device 112, and the second alignment face 114b can be formed on a part (e.g., the brake supporting portion 114a) of the front fork 114. The bicycle brake device 112 is identical to the bicycle brake device 12 except for the construction of the mounting arm 124, and the front fork 114 is identical to the front fork 14 except for the construction of the brake supporting portion 114a. The first alignment face 130a has a partial spherical concave surface. The second alignment face 114b has a partial spherical convex surface. The first alignment face 130a contacts with the second alignment face 114b. The first and second alignment faces 130a and 114b form an alignment structure 140. In other words, the first alignment face 130a of the alignment structure 140 is disposed on the bicycle brake device 112, and the second alignment face 114b of the alignment structure 140 is disposed on the brake supporting portion 114a of the front fork 114. The alignment structure 140 is disposed in the vicinity of the mounting bolt 26 (e.g., a fixing structure). The mounting bolt 26 extends through the second brake arm 22 (see FIGS. 2 and 3) and the part 130 of the mounting arm 124. Furthermore, the mounting bolt 26 extends through the brake supporting portion 114a of the front fork 114, and is threaded to the fixing nut 38 (see FIG. 3).

Furthermore, the first washer 32 can only be integrated with the attachment spacer 30 as a one-piece, unitary member. Moreover, the second washer 34 can only be integrated with the third washer 36 as a one-piece, unitary member. In these cases described above, the axial locations of the concave surface and the convex surface of the alignment structure 40 along the mounting bolt 26 are interchangeable, as described above.

With the arrangement illustrated above, the first and second alignment faces 32b and 34a have the same curvature. However, the first and second alignment faces 32b and 34a can have different curvatures. Specifically, the second washer 34 can have a flat annular end face, as the second alignment face 34a, that mates with the first alignment face 32b of the first washer 32. In particular, the first and second washers 32 and 34 are dimensioned such that an outer peripheral edge of the flat annular end face of the second washer 34 slides or rocks along the concave surface of the first alignment face 32b of the first washer 32. In this case, the axial locations of the concave surface of the first washer 32 and the flat annular end face of the second washer 34 along the mounting bolt 26 are also interchangeable as described above. On the other hand, the first washer 32 can have a flat annular end face, as the first alignment face 32b, that mates with the second alignment face 34a of the second washer 34. In particular, the first and second washers 32 and 34 are dimensioned such that an inner peripheral edge of the flat annular end face of the first washer 32 can slides or rocks along the convex surface of the second alignment face 34a of the second washer 34. In this case, the axial locations of the flat annular end face of the first washer 32 and the convex surface of the second washer 34 along the mounting bolt 26 are also interchangeable as described above. Furthermore, in these cases described above, the attachment spacer 30, and the first, second and third washers 32, 34 and 36 can be integrally formed with other bicycle components, respectively, as described above.

With the arrangement illustrated above, the alignment structure 40 with the first and second alignment faces 32b and 34a can be provided to any of axially contacting locations of brake components forming the bicycle brake device 12. For example, the alignment structure 40 can be provided between a head of the mounting bolt 26 and the second brake arm 22, between the second brake arm 22 and the mounting arm 24, or between the mounting arm 24 and the attachment spacer 30. In these cases described above, the first and second alignment faces 32b and 34a can be integrally formed on these brake components, or can be formed on separate members, such as washers, that are separate from these brake components.

Second Embodiment

Figure 10:
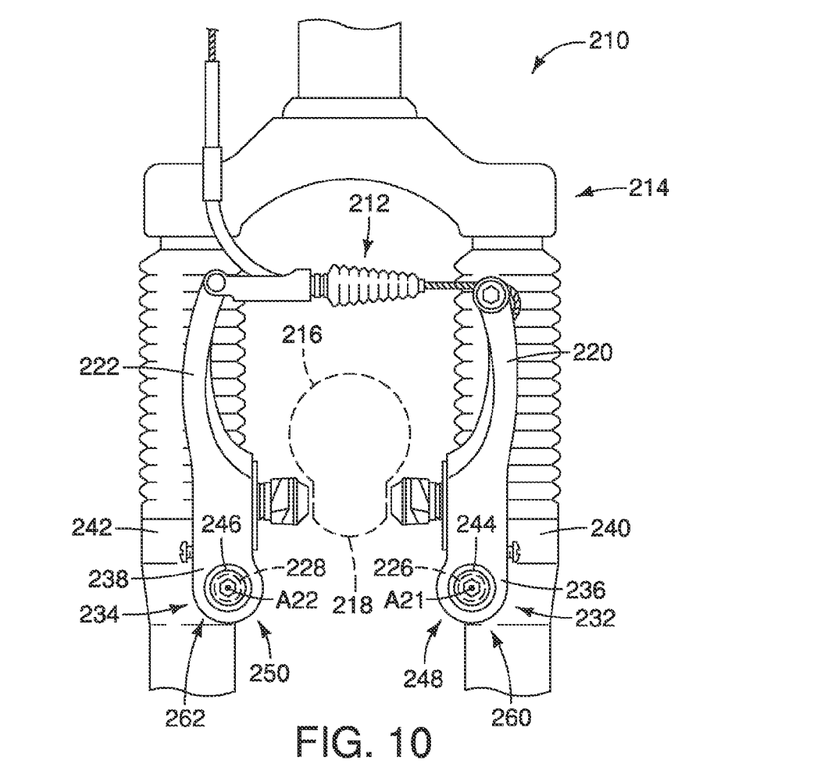
FIG. 10 is a partial front elevational view of a bicycle that is equipped with a bicycle brake assembly in accordance with a second embodiment.
Figure 11:
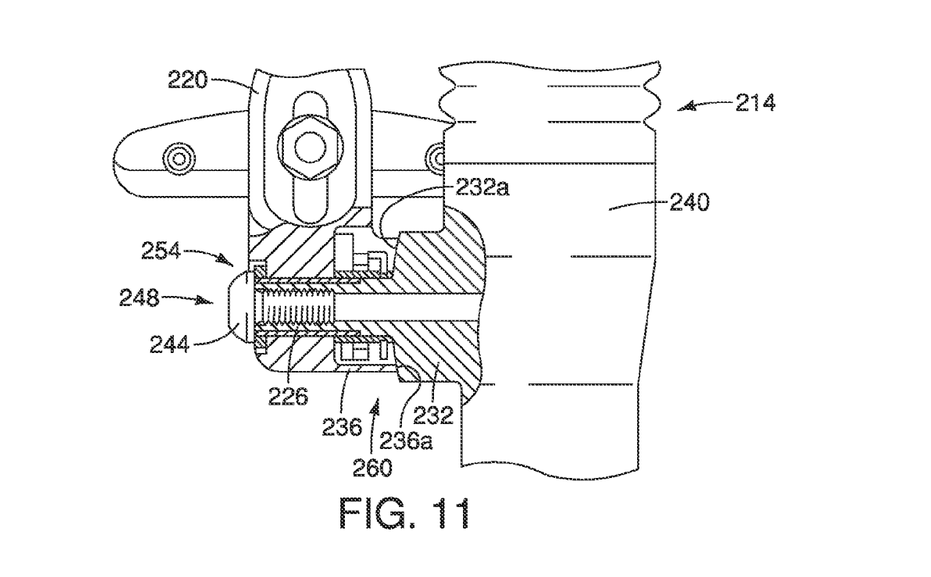
FIG. 11 is a partial side elevational view of a front fork of the bicycle and the bicycle brake assembly illustrated in FIG. 10, with a portion of the front fork and a brake arm of the bicycle brake assembly broken away to show an alignment structure of the bicycle brake assembly illustrated in FIG. 10.

Referring now to FIGS. 10 and 11, a front portion of a bicycle 210 is illustrated that is equipped with a bicycle brake device 212 (e.g., a brake unit) in accordance with a second embodiment. The bicycle brake device 212 is a cantilever type brake device. In particular, the bicycle brake device 212 is pivotally coupled to a front fork 214 (e.g., a bicycle frame) of the bicycle 210. The bicycle brake device 212 is configured and arranged relative to the front fork 21.4 for selectively gripping a front wheel 216 at a bicycle rim 218 of the front wheel 216 to apply a braking force using friction. In particular, the rider will operate a brake operating device which in turn will pull a brake cable to cause the bicycle brake device 212 to engage the bicycle rim 218 of the front wheel 216 in a conventional manner. Of course, it will be apparent from this disclosure that the bicycle brake device 212 can be mounted a rearward portion of the bicycle 210 for selectively gripping a bicycle rim of a rear wheel (not shown). Furthermore, bicycles and their various components are well-known in the prior art, and thus, the bicycle 210 and its various components will not be discussed or illustrated in detail herein, except for the components of the bicycle 210 which relate to the bicycle brake device 212.

Basically, as seen in FIG. 10, the bicycle brake device 212 includes a first brake arm 220 and a second brake arm 222. The first and second brake arms 220 and 222 are pivotally coupled at their lower ends to the front fork 214 and coupled to the brake cable at their upper ends. The first and second brake arms 220 and 222 are pivotally coupled on first and second mounting posts 226 and 228 that are formed on first and second brake supporting portions 232 and 234 of the front fork 214, respectively. The center axes of the first and second mounting posts 226 and 228 define first and second pivot axes A21 and A22 of the bicycle brake device 12. The first and second brake arms 220 and 222 include first and second mounting portions 236 and 238 (e.g., attachment portions) that are pivotally mountable to fork blades 240 and 242, respectively. The first and second mounting portions 236 and 238 are rotatably coupled to the first and second mounting posts 226 and 228 by mounting bolts 244 and 246, respectively, which forms first and second attachment structures 248 and 250 (e.g., fixing structures) between the bicycle brake device 212 and the front fork 214, respectively.

Such cantilever type brakes are described, for example, in U.S. Reissued Pat. No. US RE39,389 E, which is hereby incorporated herein by reference. Thus, for the sake of brevity, the details of the construction of the bicycle brake device 212 will be omitted.

Referring to FIG. 11, the first attachment structure 248 between the first brake arm 220 and the first brake supporting portion 232 will be described herein. Since the constructions of the first and second attachment structures 248 and 250 are mirror symmetric, the details of the construction of the second attachment structure 250 between the second brake arm 222 and the second brake supporting portion 234 will be omitted, for the sake of brevity.

As seen in FIG. 11, the first brake arm 220 has a pivot hole or opening 254 at the first mounting portion 236 (e.g., a pivot end) of the first brake arm 220. The mounting bolt 244 has a threaded fastener or screw that extends into the pivot opening 254 and is threaded into an internal threaded bore of the first mounting post 226 to pivotally couple the first brake arm 220 to the fork blade 240 of the front fork 214. The first mounting portion 236 of the first brake arm 220 has a first alignment face 236a (e.g., a first contact face) as an end face. The first alignment face 236a of the first brake arm 220 has a concave surface. In particular, the first alignment face 236a has a partial spherical concave surface. The first brake supporting portion 232 of the front fork 214 has a second alignment face 232a (e.g., a second contact face) as an end face. The second alignment face 232a has a convex surface. In particular, the second alignment face 232a has a partial spherical convex surface. The first alignment face 236a of the first brake arm 220 contacts with the second alignment face 232a of the front fork 214. The first alignment face 236a of the first brake arm 220 has the curvature that corresponds to the curvature of the second alignment face 232a of the first brake supporting portion 232. In particular, the first alignment face 236a of the first brake arm 220 has the curvature that is equal to the curvature of the second alignment face 232a of the first brake supporting portion 232 such that the first and second alignment faces 236a and 232a can fit together. Thus, the first mounting portion 236 of the first brake arm 220 and the first brake supporting portion 232 of the front fork 214 rock or slide relative to each other with respect to the first mounting post 226 while maintaining the surface-to-surface contact between the first and second alignment faces 236a and 232a. The first alignment face 236a of the first mounting portion 236 and the second alignment face 232a of the first brake supporting portion 232 form a first alignment structure 260 that aligns the first brake arm 220 of the bicycle brake device 212 to the fork blade 240 of the front fork 214. In the similar manner, the second mounting portion 238 and the second brake supporting portion 234 form a second alignment structure 262 that aligns the second brake arm 222 of the bicycle brake device 212 to the fork blade 242 of the front fork 214. The first and second alignment structures 260 and 262 are disposed on vicinities of the mounting bolts 244 and 246, respectively. Furthermore, the first and second alignment structures 260 and 262 are disposed between the first and second brake supporting portions 232 and 234 and the first and second mounting portions 236 and 238 of the bicycle brake device 212.

With these first and second alignment structures 260 and 262, misalignments between the first and second brake arms 220 and 222 and the first and second brake supporting portions 232 and 234 of the front fork 214 can be eliminated, which also ensures that the bicycle brake device 212 is accurately aligned relative to the front fork 214. Furthermore, the bicycle brake device 212 can be securely coupled to the front fork 214.

With the arrangement illustrated above, the first alignment face 236a of the first brake arm 220 has a concave face, and the second alignment face 232a of the first brake supporting portion 232 of the front fork 214 has a convex face. However, axial locations of the concave face and the convex face along the first mounting post 226 are interchangeable. For example, the first alignment face 236a of the first brake arm 220 can include a partial spherical convex surface, and the second alignment face 232a of the first brake supporting portion 232 of the front fork 214 can include a partial spherical concave surface that mates with the partial spherical convex surface of the first alignment face 236a of the first brake arm 220.

With the arrangement illustrated above, the first alignment face 236a is an end face of the first mounting portion 236 that is integrally formed with the first brake arm 220, and the second alignment face 232a is an end face of the first brake supporting portion 232 that is integrally formed with the front fork 214. However, the first alignment face 236a can be formed as an end face of a separate member from the first brake arm 220, such as a washer. In this case, the washer with the first alignment face 236a is disposed between an end face of the first mounting portion 236 of the first brake arm 220 and the first brake supporting portion 232. On the other hand, the second alignment face 232a also can be formed as an end face of a separate member from the front fork 214, such as a washer. In this case, the washer with the second alignment face 232a is disposed between the first mounting portion 236 of the first brake arm 220 and the first brake supporting portion 232. In these cases described above, the axial locations of the concave face and the convex face along the first mounting post 226 are also interchangeable as described above.

With the arrangement illustrated above, the first and second alignment faces 236a and 232a have the same curvature. However, first and second alignment faces 236a and 232a can have different curvatures. Specifically, the second alignment face 232a of the first brake supporting portion 232 of the front fork 214 can have a flat face that mates with the first alignment face 236a of the first brake arm 220. In particular, the front fork 214 and the first brake arm 220 are dimensioned such that an outer peripheral edge of the flat face of the front fork 214 can slide or rock along the concave surface of the first alignment face 236a of the first brake arm 220. In this case, the axial locations of the concave surface and the flat face along the first mounting post 226 are also interchangeable as described above. On the other hand, the first alignment face 236a of the first brake arm 220 can have a flat face that mates with the second alignment face 232a of the front fork 214. In particular, the front fork 214 and the first brake arm 220 are dimensioned such that an inner peripheral edge of the flat face of the first brake arm 220 can slide or rock along the convex surface of the second alignment face 232a of the front fork 214. In this case, the axial locations of the flat face and the convex surface along the first mounting post 226 are also interchangeable as described above. Furthermore, in these cases described above, the first alignment face 236a can be formed as an end face of a separate member from the first brake arm 220, such as a washer, as described above. On the other hand, the second alignment face 232a also can be formed as an end face of a separate member from the front fork 214, such as a washer, as described above.

With the arrangement illustrated above, the first and second alignment structures 260 and 262 can be provided to any of axially contacting locations of brake components forming the bicycle brake device 212. For example, the first alignment structure 260 can be provided between a head of the mounting bolt 244 and the first brake arm 220. In this case, the first and second alignment faces 236a and 232a can be integrally formed on these brake components, or can be formed on separate members, such as washers, that are separate from these brake components.

Third Embodiment

Figure 12:
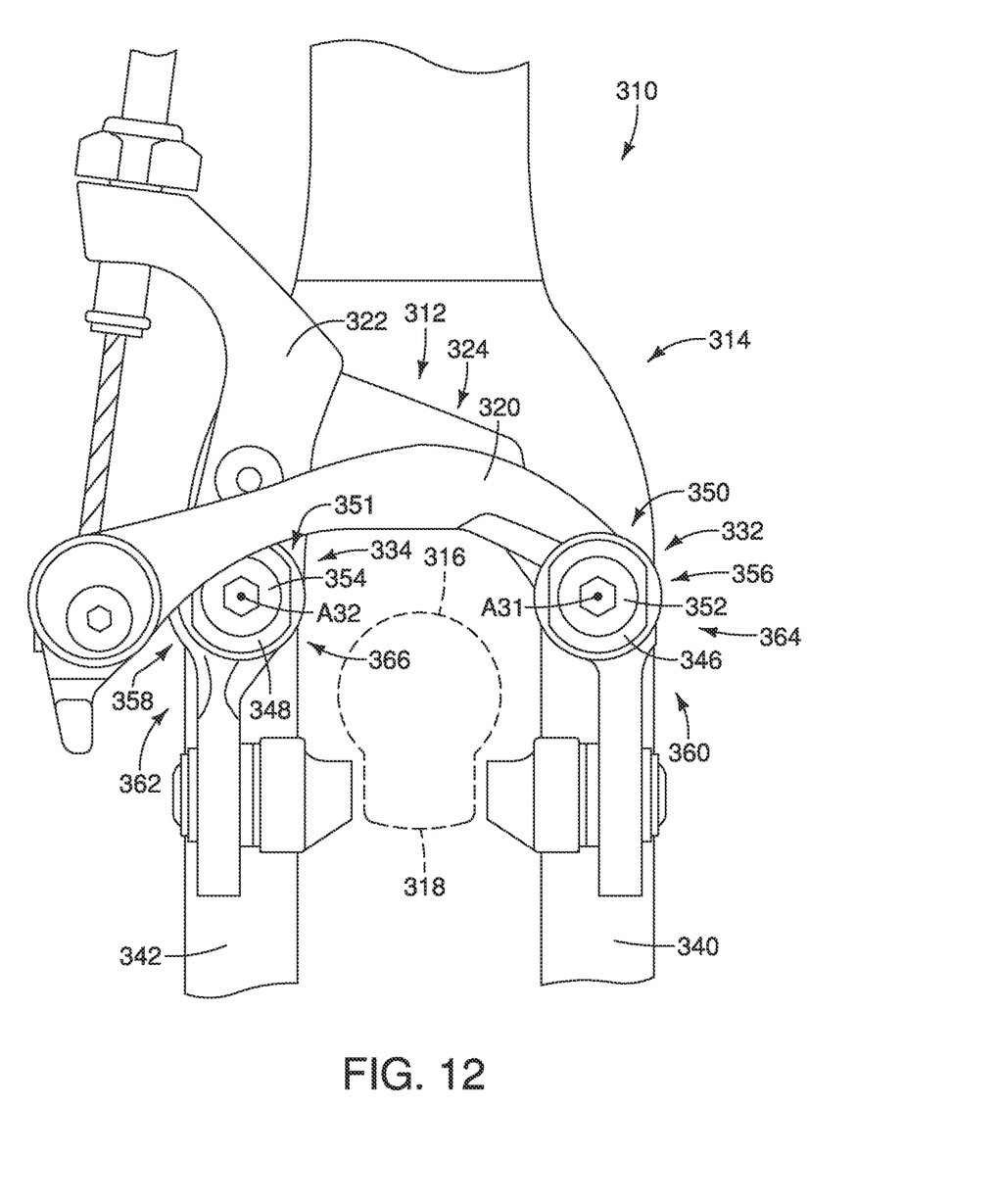
FIG. 12 is a partial front elevational view of a bicycle that is equipped with a bicycle brake assembly in accordance with a third embodiment.
Figure 13:
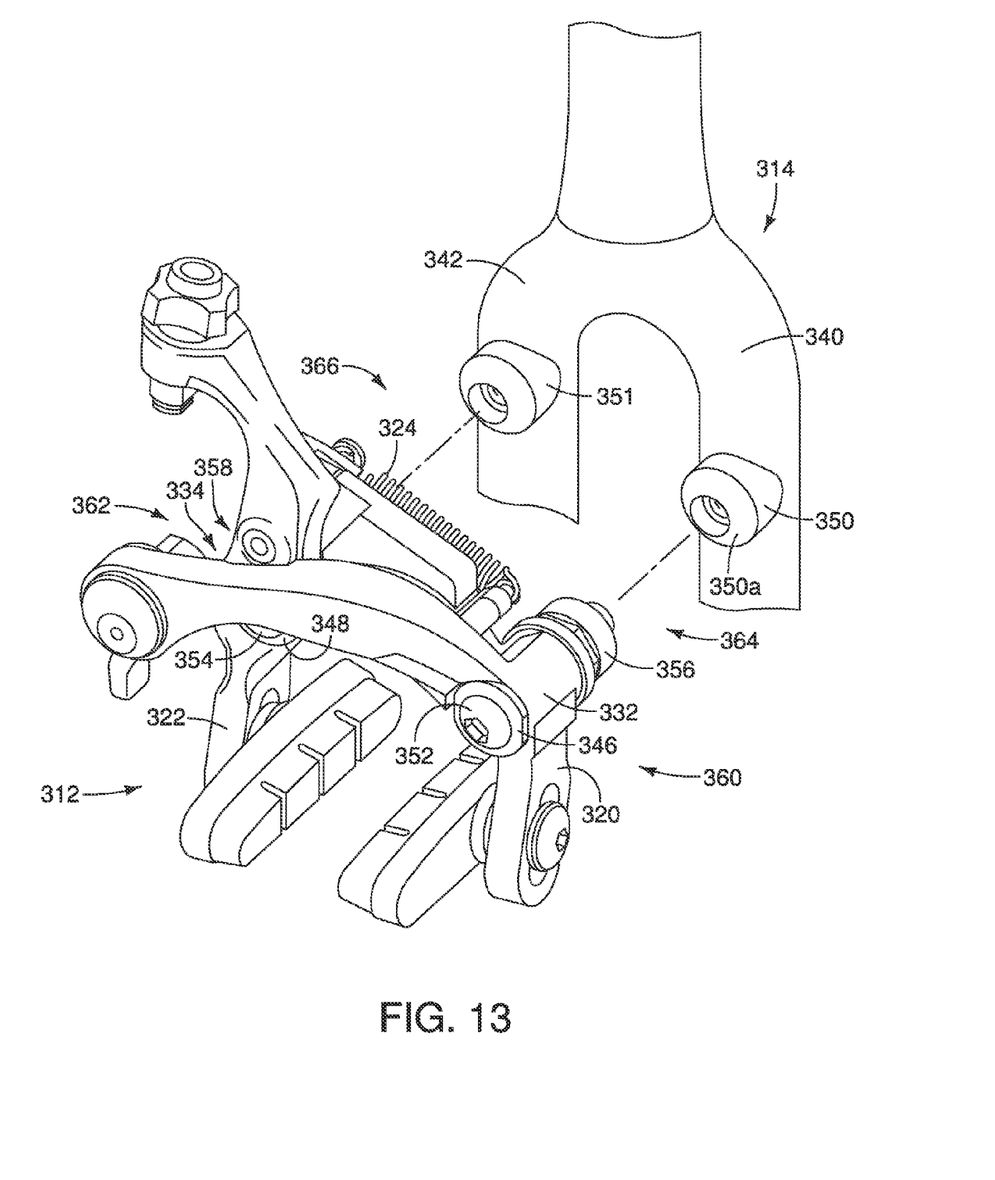
FIG. 13 is a perspective view of the bicycle brake assembly illustrated in FIG. 12.
Figure 14:
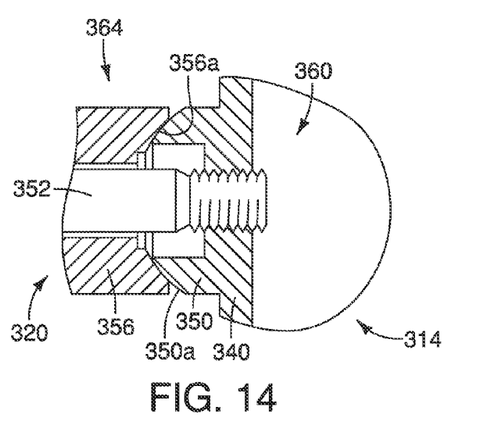
FIG. 14 is a partial cross sectional view of the bicycle brake assembly illustrated in FIG. 12, illustrating an alignment structure of the bicycle brake assembly.

Referring now to FIGS. 12 to 14, a front portion of a bicycle 310 is illustrated that is equipped with a bicycle brake device 312 (e.g., a brake unit) in accordance with a third embodiment. The bicycle brake device 312 is a side pull caliper rim brake, and more particularly, a dual-pivot, side pull caliper rim brake. In particular, the bicycle brake device 312 is pivotally coupled to a front fork 314 (e.g., a bicycle frame) of the bicycle 310. The bicycle brake device 312 is configured and arranged relative to the front fork 314 for selectively gripping a front wheel 316 at a bicycle rim 318 of the front wheel 316 to apply a braking force using friction. In particular, the rider will operate a brake operating device which in turn will pull a brake cable to cause the bicycle brake device 312 to engage the bicycle rim 318 of the front wheel 316 in a conventional manner. Of course, it will be apparent from this disclosure that the bicycle brake device 3112 can be mounted a rearward portion of the bicycle 310 for selectively gripping a bicycle rim of a rear wheel (not shown). Furthermore, bicycles and their various components are well-known in the prior art, and thus, the bicycle 310 and its various components will not be discussed or illustrated in detail herein, except for the components of the bicycle 310 which relate to the bicycle brake device 312.

Basically, as seen in FIGS. 12 and 13, the bicycle brake device 312 basically includes a first brake arm 320, a second brake arm 322 and a biasing member 324. The first brake arm 320 and the second brake arm 322 are rigid members formed of a suitable material such as a metallic material or a fiber reinforced plastic material. The first and second brake arms 320 and 322 are pivotally coupled to the front fork 314. In particular, first and second brake arms 320 and 322 include first and second mounting portions 332 and 334 that are pivotally mountable to fork blades 340 and 342, respectively. The first and second mounting portions 332 and 334 have brake attachment bushings 346 and 348, respectively, that rotatably support mounting bolts 352 and 354 for mounting the first and second mounting portions 332 and 334 to the fork blades 340 and 342 of the front fork 314, respectively.

Such caliper rim brakes are described, for example, in U.S. patent application Ser. Nos. 13/040,930, 13/041,030, and 13/408,324, which are hereby incorporated herein by reference. Thus, for the sake of brevity, the details of the construction of the bicycle brake device 312 will be omitted.

Referring to FIGS. 12 and 13, the first and second brake arms 320 and 322 are pivotally coupled to first and second brake supporting portions 350 and 351 on the fork blades 340 and 342 of the front fork 314, respectively, by the mounting bolts 352 and 354. The center axes of the mounting bolts 352 and 354 define first and second pivot axes A31 and A32 of the bicycle brake device 12. In particular, the mounting bolts 352 and 354 extend through the brake attachment bushings 346 and 348 of the first and second mounting portions 332 and 334. Furthermore, first and second attachment spacers 356 and 358 (e.g., attachment portions) are axially disposed between the first and second mounting portions 332 and 334 and the first and second brake supporting portions 350 and 351 of the fork blades 340 and 342, respectively. The mounting bolts 352 and 354 threadedly or non-threadedly extends through the first and second attachment spacers 356 and 358, and then are directly threaded to threaded portions formed on the first and second brake supporting portions 350 and 351 of the fork blades 340 and 342 of the front fork 314, respectively, which forms first and second attachment structures 360 and 362 between the bicycle brake device 312 and the front fork 314.

Referring to FIG. 14, the first attachment structure 360 will be described in detail. Since the second attachment structure 362 has an identical or similar construction to the first attachment structure 360, for the sake of brevity, the details of the second attachment structure 362 will be omitted.

As seen in FIG. 14, the mounting bolt 352 extends through the first attachment spacer 356, and then is directly threaded to the threaded portion formed on the first brake supporting portion 350 of the fork blade 340 of the front fork 314 to pivotally couple the first brake arm 320 to the fork blade 340 of the front fork 314. The first attachment spacer 356 has a first alignment face 356a that contacts with a second alignment face 350a of the first brake supporting portion 350 of the front fork 314. The first alignment face 356a of the first attachment spacer 356 has a partial spherical concave surface. On the other hand, the second alignment face 350a of the first brake supporting portion 350 of the front fork 314 has a partial spherical concave surface. The first alignment face 356a of the first attachment spacer 356 has the curvature that corresponds to the curvature of the second alignment face 350a of the first brake supporting portion 350. In particular, the first alignment face 356a has the curvature that is equal to the curvature of the second alignment face 350a such that the first alignment face 356a and the second alignment face 350a fit together. Thus, the first attachment spacer 356 of the first brake arm 320 and the first brake supporting portion 350 of the front fork 314 rock or slide relative to each other with respect to the mounting bolt 352 while maintaining the surface-to-surface contact between the first and second alignment faces 356a and 350a. The first alignment face 356a of the first attachment spacer 356 and the second alignment face 350a of the first brake supporting portion 350 form a first alignment structure 364 that aligns the first brake arm 320 of the bicycle brake device 312 to the fork blade 340 of the front fork 314. In the similar manner, the second attachment spacer 358 and the second brake supporting portion 351 form a second alignment structure 366 that aligns the second brake arm 322 of the bicycle brake device 312 to the fork blade 342 of the front fork 314. The first and second alignment structures 364 and 366 are disposed on vicinities of the mounting bolts 352 and 354, respectively, Furthermore, the first and second alignment structures 364 and 366 are disposed between the first and second brake supporting portions 350 and 351 and the first and second attachment spacers 356 and 358 of the bicycle brake device 312.

With these first and second alignment structures 364 and 366, misalignments between the first and second brake arms 320 and 322 and the fork blades 340 and 342 of the front fork 314 can be eliminated, which also ensures that the bicycle brake device 312 is accurately aligned relative to the front fork 314. Furthermore, the bicycle brake device 312 can be securely coupled to the front fork 314.

With the arrangement illustrated above, the first alignment face 356a of the first attachment spacer 356 has a concave face, and the second alignment face 350a of the first brake supporting portion 350 of the front fork 314 has a convex face. However, axial locations of the concave face and the convex face along the mounting bolt 352 are interchangeable. For example, the first alignment face 356a of the first attachment spacer 356 can include a partial spherical convex surface, and the second alignment face 350a of the first brake supporting portion 350 of the front fork 314 can include a partial spherical concave surface that mates with the partial spherical convex surface of the first alignment face 356a of the first attachment spacer 356.

With the arrangement illustrated above, the first alignment face 356a is an end face of the first attachment spacer 356 that is separately formed with the first brake arm 320, and the second alignment face 350a is an end face of the first brake supporting portion 350 that is integrally formed with the front fork 314. However, first alignment face 356a can be formed as an end face of a first attachment spacer that is integrally formed with the first brake arm 320. On the other hand, the first alignment face 356a can be formed as an end face of a separate member from the first attachment spacer 356, such as a washer. In this case, the washer with the first alignment face 356a is disposed between an end face of the first attachment spacer 356 of the first brake arm 320 and the first brake supporting portion 350. Furthermore, the second alignment face 350a can be formed as an end face of a separate member from the front fork 314, such as a washer. In this case, the washer with the second alignment face 350a is disposed between the first attachment spacer 356 and the first brake supporting portion 350. In these cases described above, the axial locations of the concave face and the convex face along the mounting bolt 352 are also interchangeable as described above.

With the arrangement illustrated above, the first and second alignment faces 356a and 350a have the same curvature. However, the first and second alignment faces 356a and 350a can have different curvatures. Specifically, the second alignment face 350a of the first brake supporting portion 350 of the front fork 314 can have a flat annular end face that mates with the first alignment face 356a of the first brake arm 320. In particular, the front fork 314 and the first brake arm 320 are dimensioned such that an outer peripheral edge of the flat annular end face of the first brake supporting portion 350 of the front fork 314 can slide or rock along the concave surface of the first alignment face 356a of the first brake arm 320. In this case, the axial locations of the concave surface of the first alignment face 356a and the flat annular end face along the mounting bolt 352 are also interchangeable as described above, On the other hand, the first alignment face 356a of the first brake arm 320 can have a flat annular end face that mates with the second alignment face 350a of the first brake supporting portion 350. In particular, the front fork 314 and the first brake arm 320 are dimensioned such that an inner peripheral edge of the flat annular end face of the first attachment spacer 356 of the first brake arm 320 can slide or rock along the convex surface of the second alignment face 350a of the first brake supporting portion 350 of the front fork 314. In this case, the axial locations of the flat annular end face and the convex surface of the second alignment face 350a along the mounting bolt 352 are also interchangeable as described above. Furthermore, in these cases described above, the first alignment face 356a can be formed as an end face of a separate member from the first brake arm 320, such as a washer. On the other hand, the second alignment face 350a also can be formed as an end face of a separate member from the front fork 314, such as a washer.

With the arrangement illustrated above, the first and second alignment structures 364 and 366 can be provided to any of axially contacting locations of brake components forming the bicycle brake device 312. For example, the first alignment structure 364 can be provided between a head of the mounting bolt 352 and the first brake arm 320, or between first brake arm 320 and the first attachment spacer 356. In these cases described above, the first and second alignment faces 356a and 350a can be integrally formed on these brake components, or can be formed on separate members, such as washers, that are separate from these brake components. Furthermore, the second alignment structure 366 can be provided between a head of the mounting bolt 354 and the second brake arm 322, or between second brake arm 322 and the second attachment spacer 352.

Figure 15:
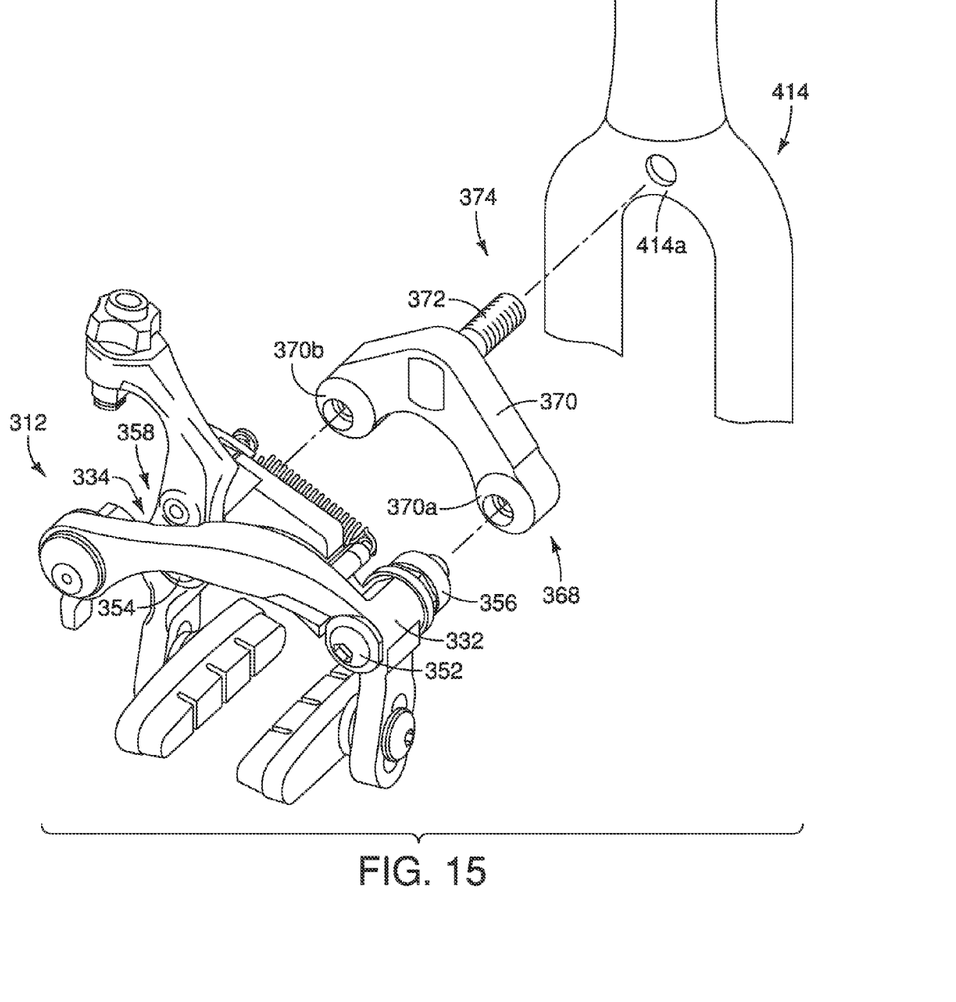
FIG. 15 is an exploded perspective view of a modified bicycle brake device of a bicycle brake assembly.

In this embodiment shown in FIGS. 12 and 13, the bicycle brake device 312 is directly mounted to the front fork 314 via the first and second attachment structures 360 and 362. On the other hand, as seen in FIG. 15, the bicycle brake device 312 can be mounted to a front fork via an adapter 368. The adapter 368 is mountable to an existing frame or to a new frame when there is only one mounting hole, such as a centrally-disposed mounting hole used fbr mounting some types of side-pull brakes.

As illustrated in FIG. 15, the adapter 368 has an adapter body 370 with first and second brake attachment portions 370a and 370b, and a fixing bolt 372. The mounting bolts 352 and 354 of the bicycle brake device 312 extend through the first and second mounting portions 332 and 334, and then directly threaded to threaded portions formed on the first and second brake attachment portions 370a and 370b of the adapter 368. The fixing bolt 372 extends through a mounting hole formed on a brake supporting portion 414a of a front fork 414, and then is screwed to a fixing nut to fixedly couple the adapter 368 to the front fork 414. This forms a single attachment structure 374 between the bicycle brake device 312 and the front fork 414.

With this arrangement, the first and second alignment structures 364 and 366 described above can be provided between the first and second attachment spacers 356 and 358 of the bicycle brake device 312 and the first and second brake attachment portions 370a and 370b of the adapter 368. With these first and second alignment structures 364 and 366, misalignments between the first and second brake arms 320 and 322 and the front fork 314 can be eliminated, which ensures that the bicycle brake device 312 is accurately aligned relative to the front fork 414. Furthermore, the bicycle brake device 312 can be securely coupled to the front fork 414.

Alternatively or additionally, the alignment structure 40 illustrated in the first embodiment can also be provided between the adapter 368 and the front fork 14 in a manner described in the first embodiment. This also ensures that the bicycle brake device 312 is accurately aligned relative to the front fork 414. Furthermore, the bicycle brake device 312 can be securely coupled to the front fork 414.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise specified.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle brake assembly comprising:
    a brake unit including first and second pivotal brake arms and a spring member, the first and second brake arms being configured to be pivotal relative to each other without being directly connected to each other, the spring member being disposed between the first and second pivotal brake arms to bias each of the first and second brake arms to a non-braking position;
    a fixing structure configured to operatively couple the brake unit to a brake supporting portion of a bicycle frame; and
    an alignment structure configured to receive a mounting bolt of the fixing structure such that the brake unit is movable relative to the alignment structure, the alignment structure configured to align the brake unit to the brake supporting portion, and one of the first and second brake arms being configured to receive the mounting bolt of the fixing structure, the alignment structure including first, second and third washers, each of the first and second washers having a partial spherical surface, the second washer arranged farther from the brake unit than the first washer, the third washer arranged farther from the brake unit than the second washer, the second washer having a mounting hole having an inner diameter larger than an outer diameter of the mounting bolt to allow radial movement of the second washer with respect to the mounting bolt, and a mounting hole of the third washer having an inner diameter smaller than the inner diameter of the second washer.

2. The bicycle brake assembly according to claim 1, wherein
    the alignment structure is disposed on the brake supporting portion.
3. The bicycle brake assembly according to claim 1, wherein
    the alignment structure disposed on the brake unit.
4. The bicycle brake assembly according to claim 1, wherein
    the brake unit further includes an attachment portion attachable to the brake supporting portion.
5. The bicycle brake assembly according to claim 4, wherein
    the alignment structure is disposed on the attachment portion of the brake unit.
6. The bicycle brake assembly according to claim 1, wherein
    the alignment structure is disposed between the brake supporting portion and the brake unit.
7. The bicycle brake assembly according to claim 1, wherein
    one of the partial spherical surfaces includes a partial spherical convex surface.
8. The bicycle brake assembly according to claim 1, wherein
    one of the partial spherical surfaces includes a partial spherical concave surface.
9. The bicycle brake assembly according to claim 1, wherein
    one of the partial spherical surfaces includes a partial spherical concave surface, and
    another of the partial spherical surfaces includes a partial spherical convex surface.
10. The bicycle brake assembly according to claim 1, wherein
    the first and second washers have first and second contact faces, respectively, the first and second contact faces of the first and second washers mating with each other, at least one of the first and second contact faces of the first and second washers including one of the partial spherical surfaces.
11. The bicycle brake assembly according to claim 10, wherein
    one of the first and second contact faces includes a concave surface, and
    the other of the first and second contact faces includes a convex surface.
12. The bicycle brake assembly according to claim 10, wherein
    the first washer further has a flat contact face that is opposite the first contact face of the first washer, the flat contact face of the first washer contacting with an abutment face of one of the brake unit and the brake supporting portion.
13. The bicycle brake assembly according to claim 1, wherein
    the fixing structure includes a fixing bolt that extends through the first and second washers.
14. The bicycle brake assembly according to claim 1, wherein
    the brake unit is a caliper brake.
15. The bicycle brake assembly according to claim 1, wherein
    a mounting hole of the first washer has an inner diameter smaller than the inner diameter of the second washer.

* * * * *